United States Patent [19]

Mauldin

[11] Patent Number: 5,886,703
[45] Date of Patent: Mar. 23, 1999

[54] PERSPECTIVE CORRECT TEXTURE MAPPING SYSTEM AND METHODS WITH INTELLIGENT SUBDIVISION

[75] Inventor: Jeffrey Alan Mauldin, Chapel Hill, N.C.

[73] Assignee: Virtus Corporation, Cary, N.C.

[21] Appl. No.: 742,441

[22] Filed: Nov. 1, 1996

Related U.S. Application Data

[63] Continuation of Ser. No. 382,375, Feb. 1, 1995, abandoned.

[51] Int. Cl.$^6$ .................................................. G06T 17/20
[52] U.S. Cl. ............................................................ 345/423
[58] Field of Search .................................. 395/123, 130, 395/142; 345/423, 430, 442

[56] References Cited

U.S. PATENT DOCUMENTS

| | | | |
|---|---|---|---|
| 5,299,302 | 3/1994 | Fiasconaro | 345/442 |
| 5,307,450 | 4/1994 | Grossman | 345/423 |
| 5,353,389 | 10/1994 | Fiasconaro | 345/419 |
| 5,363,479 | 11/1994 | Olynkyk | 345/442 |
| 5,394,516 | 2/1995 | Winser | 345/419 |
| 5,408,598 | 4/1995 | Pryor, Jr. | 345/442 |
| 5,416,848 | 5/1995 | Young | 345/441 X |
| 5,625,768 | 4/1997 | Dye | 345/441 |

FOREIGN PATENT DOCUMENTS 6-36039  2/1994  Japan .

OTHER PUBLICATIONS

Foley et al., Computer Graphics: Principle and Practice, 1990, pp. 686–695, 1990.

Snyder, Interval Analysis for Computer Graphics, Computer Graphics, v.26,n.2,Jul. 1992,pp. 121–130.

Nelson et al., Problem Solving and Computer Programming, p. 46, 84–85, 172, 1982.

D. Kirk et al., "The Rendering Architecture of the *DN10000VS*", Proceedings of SIGGRAPH '90, Dallas, Texas, Aug. 6–10, 1990, p. 304–305.

G. Wolberg, "*Digital Image Warping*", IEEE Computer Society Press, Los Alamitos, CA, 1990, pp. 196, 199–200.

J. Foley et al., Computer Graphics Principles and Practice, Second Edition, Addison–Wesley Publishing Company, Inc., 1990, pp. 230–237.

*Primary Examiner*—Anton Fetting
*Attorney, Agent, or Firm*—Haynes and Boone, L.L.P.

[57] ABSTRACT

High speed, perspective correct texture mapping is performed by identifying lines of constant depth in a polygon and repeatedly subdividing the polygon along lines of constant depth to produce subpolygons having a maximum mapping error which is less than a predetermined maximum mapping error, preferably less than one pixel. Subdivision may be performed using a "Check/Subdivide/Check" embodiment or a "Predictive Subdivision" embodiment. In Check/Subdivide/Check, a greatest mapping error for a polygon is determined, and if the mapping error is greater than a predetermined mapping error, the polygon is further subdivided. In Predictive Subdivision, a polygon is subdivided into subpolygons which are sufficiently small to ensure that maximum texture mapping error is less than a predetermined mapping error, so that repeated checking and subdividing is not necessary. In either embodiment, linear interpolation can be used for high speed texture mapping, while maintaining the perspective error to below any desired maximum.

6 Claims, 7 Drawing Sheets

PERSPECTIVE CORRECT TEXTURE MAPPING SYSTEM AND METHODS WITH INTELLIGENT SUBDIVISION

This application is a continuation of application Ser. No. 08/382,375, filed Feb. 1, 1995, abandoned.

FIELD OF THE INVENTION

This invention relates to computer-based graphical processing and more particularly to methods and systems for performing texture mapping in computer-based graphical processing.

BACKGROUND OF THE INVENTION

Computer-based graphical processing systems and methods are widely used for displaying three-dimensional images on a two-dimensional graphical display. The three-dimensional images are typically formed of collections of polygons. In order to add surface details to the image, texture mapping is typically used. In texture mapping, a patterned image or texture bitmap is plastered onto a polygon surface to thereby produce a modified object with the added detail of the texture. When the texture-mapped polygon is rendered into a scene, the texture is also rendered as if it were painted on the polygon.

Texture mapping of a polygon on a graphical display is generally accomplished by finding texture coordinates at the center of each pixel inside the polygon and coloring the pixels with the corresponding bits from the texture. The bits from the texture are also referred to as "texels".

Texture mapping allows detail to be added to a scene without significantly complicating the scene's model. For example, brick walls, tiled and carpeted floors, and complex control panels may be rendered with just a few polygons. Pictures on walls can be digitized versions of actual pictures. Grass, trees, water and bushes may be rendered convincingly with minimal modeling. Thus, with texture mapping, a model-maker can create more realistic models with less effort.

Although texture mapping simplifies modeling, it complicates rendering of the scene on the two-dimensional graphical display. If the textures are not rendered precisely, the viewer may see annoying distortion. Generally, precise perspective correct texture mapping may be provided, but at the expense of rendering speed.

There are several texture mapping methods and systems currently in use. Some sacrifice precision for the sake of speed, as is often necessary when developing interactive systems. Others are precise, but are too slow for interactive use.

The simplest high speed texture mapping system and method is linear approximation. For example, a polygon with correct texture points at the vertices is scan-converted from top-to-bottom, linearly interpolating texture coordinates both along polygon edges and across scanlines. Linear approximation is not exact, however, because texture coordinates are linear with respect to pre-perspective projection world space, not post-projection display space.

For example, consider a segment in screen space from $(x_{s1}, y_{s1})$ to $(x_{s2}, y_{s2})$, with correct texture coordinates $(u_1, v_1)$ and $(u_2, v_2)$. To linearly interpolate texture coordinates at $(x_s, y_s)$ along the segment:

$$u_{linearapprox} = u_1 + q\,(u_2 - u_1)$$
$$v_{linearapprox} = v_1 + q\,(u_2 - u_1) \quad (1)$$

where $q = (x_s - x_{s1})/(x_{s2} - x_{s1})$ or $(y_s - y_{s1})/(y_{s2} - y_{s1})$
that is, q is the fraction of the distance along the segment from $(x_{s1}, y_{s1})$ to $(x_{s2}, y_{s2})$. The domain of the u and v variables depends on the size of the texture bitmap. To simplify the equations, the texture coordinates are normalized so that $u_1 = v_1 = 0$, and $u_2 = v_2 = 1$:

$$u_{linearapprox} = q$$
$$v_{linearapprox} = q \quad (2)$$

where q is as described in Equations (1).

A system or method can calculate delta values for u and v, and can add to calculate each successive texture coordinate along the line. To perform a complete two-dimensional texture mapping as described above, Equations (2) are used to interpolate texture coordinates both along polygon edges and across scanlines.

Linear approximation is relatively simple and computationally inexpensive, but the distortion it produces is usually unacceptable. As an example, see FIG. 1 which illustrates a cube which is texture-mapped with a checkerboard pattern. The lines separating the rows and columns of squares should be straight, but they are bent and twisted, especially on the top and right sides of the cube.

Approximation can be improved by using quadratic rather than linear interpolation. See the publications by D. Kirk et al., "*The Rendering Architecture of the DN10000VS*", Proceedings of SIGGRAPH '90, Dallas, Tex., Aug. 6–10, 1990, pages 304–305, and G. Wolberg, "*Digital Image Warping*", IEEE Computer Society Press, Los Alamitos, Calif., 1990, pages 199–200. For a modest increase in per-pixel calculation, texture mapped surfaces can cover a wider range of depth and still be rendered without noticeable distortion. Distortion still occurs, however, and in certain circumstances this distortion looks worse than distortion from linear approximation.

A second basic strategy for perspective correct texture mapping is subdivision. A polygon is divided, typically in half, to produce subpolygons, and correct texture coordinates are computed exactly for the new subpolygon corners. Each subpolygon is further subdivided, typically in half, and at some point the resulting subpolygons are rendered using linear, quadratic, or even constant approximation. An example of subdivision is described in Japanese published Patent Application 06-036039, published Feb. 10, 1994 to Takahisa et al. entitled Texture Mapping Device. As shown therein, a texture mapping device is equipped with an error evaluation expression calculation part, which calculates an error evaluation expression. When the maximum value of the error evaluation expression exceeds a predetermined permissible error, the projection plane is subdivided.

Another example of subdivision is described in U.S. Pat. No. 5,307,450 to Grossman entitled Z-Subdivision for Improved Texture Mapping. Disclosed is a graphical display system and method for Z-subdivision of polygons into quadrilaterals and triangles whose vertices are arranged between two adjacent Z-planes. Once a primitive is sliced into component portions, a texture is mapped onto each component portion by interpolating texture parameters to points on or within the component portion.

There are occasions where texture mapping must be exact, even if a viewer cannot see gross distortion. For example, consider a polygon with a city map texture. There may be situations where a rendering system places "pins" on the map to mark locations, and renders the pins as additional polygons. If the texture mapping is not sufficiently accurate, the pins will likely be over incorrect positions on the map even though the map may not look distorted. An even worse problem is that the map will "dance" around beneath the pins as the observer moves.

Exact calculation systems and methods often calculate the correct texture coordinates incrementally so that a texture-mapped polygon may be rendered by incrementing along polygon edges and across scanlines, just as in the linear approximation algorithms described above. See a publication by G. Wolberg, entitled "*Digital Image Warping*", IEEE Computer Society Press, Los Alamitos, Calif., 1990, page 196.

For example, assuming a line in pre-perspective projection space is rotated and translated so that the viewing vector is along the z axis, projecting the line's endpoints $(x_1, y_1, z_1)$ and $(x_2, y_2, z_2)$ requires dividing the non-depth coordinates by the depth:

$$(x_{s1}, y_{s1}) = (x_1/z_1, y_1/z_1)$$

$$(x_{s2}, y_{s2}) = (x_2/z_2, y_2/z_2)$$

Although the texture coordinates are not linear in screen space, the depth reciprocal, $1/z$, is linear. See the textbook entitled *Computer Graphics Principles and Practice*, Second Edition by J. Foley et al., Addison-Wesley Publishing Company, Inc., 1990, pages 230–237. Accordingly, for a screen point $(x_s, y_s)$ along the line:

$$(x, y, z) = (x_s/w, y_s/w, 1/w)$$

where w is interpolated between $(x_{s1}, y_{s1})$ and $(x_{s2}, y_{s2})$, i.e.:

$$w = w_1 + q(w_2 - w_1)$$

where $q = (x_s - x_{s1})/(x_{s2} - x_{s1})$ or $(y_2 - y_{s1})/(y_{s2} - y_{s1})$ that is, q is the fraction of the distance along the segment from $(x_{s1}, y_{s1})$ to $(x_{s2}, y_{s2})$ and where $w_1 = 1/z_1$ and $w_2 = 1/z_2$ In order to obtain a correct texture coordinate for screen coordinate $(x_s, y_s)$, the exact calculation technique inverse projects to find the world coordinates $(x, y)$ and uses these coordinates to linearly interpolate the texture coordinates:

$$u_{correct} = u_1 + r(u_2 - u_1)$$
$$r = (x - x_1)/(x_2 - x_1)$$
$$x = (x_s/w)$$
$$w = w_1 + q(w_2 - w_1)$$
$$q = (x_s - x_{s1})/(x_{s2} - x1_{s1})$$
$$w_1 = 1/z_1$$
$$w_2 = 1/z_2$$

These equations can also use $y_s$ values instead of $x_s$ values, and there is a similar operation to find v coordinates. Normalizing u, and substituting r into the equation for $u_{correct}$:

$$u_{correct} = (x - x_1)/(x_2 - x_1)$$

Substituting in $x = x_s/w$, $x_1 = x_{s1}/w_1$, and $x_2 = x_{s2}/w_2$:

$$u_{correct} = \frac{((x_s/w) - (x_{s1}/w_1))}{((x_{s2}/w_2) - (x_{s1}/w_1))} \quad (3)$$

$$w = w_1 + q(w_2 - w_1)$$
$$q = (x_s - x_{s1})/(x_{s2} - x_{s1})$$
$$w_1 = 1/z_1$$
$$w_2 = 1/z_2.$$

In order to obtain correct texture points along the line $((x_1, y_1), (x_2, y_2))$, rendering increments $x_s$ from $x_1$ to $x_2$ and w from $w_1$ to $w_2$ and evaluates Equation (3) at each increment. An entire polygon can thus be rendered in this manner, using Equation (3) to incrementally calculate correct texture coordinates along polygon edges and also across scanlines.

Unfortunately, exact calculation requires at least two divides (or a divide and two multiplies) per pixel. Although perspective correct results are obtained, the calculation time is generally excessive.

In conclusion, texture mapping methods and systems have generally been either accurate and slow or fast and inaccurate. As high resolution graphical display systems are increasingly being used for many consumer, commercial and military applications, there is a greater need for perspective correct texture mapping. Moreover, as the systems are increasingly used for real-time viewing of three-dimensional scenes, there is an increased need for high speed texture mapping. Even as machines become faster, screen resolutions and polygon counts will continue to increase, so that fast, perspective correct texture mapping will continue to be needed.

SUMMARY OF THE INVENTION

It is therefore an object of the present invention to provide improved texture mapping systems and methods.

It is another object of the invention to provide texture mapping systems and methods which are perspective correct, but which can be performed at high speed.

These and other objects are provided, according to the present invention, by intelligently subdividing a polygon along selected lines of constant depth, to produce a plurality of subpolygons having a maximum mapping error which is less than a predetermined greatest mapping error. The number of subdivisions which are necessary is thereby reduced compared to arbitrary subdivision techniques, to thereby produce a high speed texture mapping method and system. Moreover, subdivision is performed until the mapping step can be performed with less than a predetermined mapping error, so that perspective correct texture mapping is obtained at high speed.

In a first embodiment, referred to herein as a "Check/Subdivide/Check" embodiment, a check is made as to whether a mapping error is greater than a maximum allowable mapping error, and the polygon is subdivided along the line of constant depth if the mapping error is greater than the allowed maximum. Subdividing and checking continues until all subpolygons have mapping error less than the maximum allowable mapping error. In a second embodiment, referred to herein as "Predictive Subdivision", the polygon is subdivided along lines of constant depth which ensure that each subdivided polygon has a maximum mapping error which is less than a predetermined mapping error, without the need for checking. In either embodiment, fewer subdivisions are required and each subdivision can be rendered with high precision to provide high speed perspective correct texture mapping.

In particular, according to the Check/Subdivide/Check embodiment, texture is mapped onto a polygon which is displayed on a two-dimensional graphical display by identifying lines of constant depth in the polygon, determining a mapping error for the polygon and checking whether the mapping error is greater than a predetermined maximum mapping error. The polygon is subdivided along a selected line of constant depth having the same depth as the mapping error if the mapping error is greater than the predetermined mapping error, to produce subpolygons. Determination of a mapping error, checking whether the determined mapping error is acceptable, and subdividing if the mapping error is unacceptable, are repeatedly performed on the subpolygons. Texture is then mapped onto the subpolygons.

In a preferred embodiment of Check/Subdivide/Check, a maximum mapping error for the polygon is determined. The maximum mapping error may be determined by summing the maximum scanline mapping error and the maximum edge mapping error. Alternatively, one of the maximum scanline mapping error or maximum edge mapping error may be used. In yet another alternative, a maximum bounding parallelogram error may be determined. Preferably, the predetermined mapping error is less than one pixel in size so that perspective correct error mapping may be performed. However, larger maximum error deviations may be permitted.

Texture mapping is performed on the subpolygons by linearly interpolating texture onto the subpolygons. Because texture mapping may have difficulties with subpolygon edges, linear interpolation may be used on the interiors of subpolygons and exact mapping may be used at the edges of subpolygons.

Preferably, subdividing takes place by determining a first depth of a farthest point on the polygon, and a second depth of a closest point on the polygon. The square root of the product of the first depth and the second depth is calculated, and the polygon is subdivided along a line of constant depth having the same depth as a calculated square root. Calculation speed may be increased by calculating an approximate square root using table lookup or other known techniques. Subdivision preferably only takes place if the subpolygon is greater than a predetermined size. Accordingly, small polygons whose texture mapping error will not be perceivable, are not further subdivided.

According to the "Predictive Subdivision" embodiment of the present invention, the polygon is subdivided along a line of constant depth into a first subpolygon having a maximum mapping error which is less than a predetermined maximum mapping error, and into a second subpolygon. The maximum mapping error may be determined as described above. Subdivision is repeatedly performed on the second polygon to thereby subdivide the polygon into a plurality of subpolygons, each having a maximum mapping error which is less than the predetermined maximum mapping error. Stated differently, as the polygon is crossed, subpolygons which have maximum mapping error which is less than the predetermined maximum mapping error are subdivided out, until the entire polygon is subdivided into subpolygons. Texture is mapped onto the plurality of subpolygons, as described above.

In Predictive Subdivision, each subdivision may be take place using two passes. The polygon is first subdivided to identify a tentative first subpolygon having a maximum edge mapping error which is less than the predetermined maximum mapping error. The tentative first subpolygon is then further subdivided if necessary, to identify the first subpolygon having a maximum scanline mapping error which is less than the predetermined mapping error. Thus, edge mapping and scanline mapping are checked separately. Subdivision takes place along lines of constant depth having the same depth as the predetermined mapping error using the square root calculation as described above.

Accordingly, texture mapping may be performed at high speed and with deviations from accuracy which are less than the pixel resolution of the graphical display so that perspective correct texture mapping may be provided.

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

A preferred embodiment of the invention may be implemented in a computer program which runs on a standard personal computer, such as a Power-PC system. This system will only be briefly described, because it is well known to those having skill in the art. Similarly, the invention utilizes, in part, many known graphics techniques for defining objects and for generating a graphics display. These techniques will also not be described in detail herein. Rather, the description will concentrate on methods and systems for perspective correct texture mapping using intelligent subdivision according to the present invention.

Figure 2:
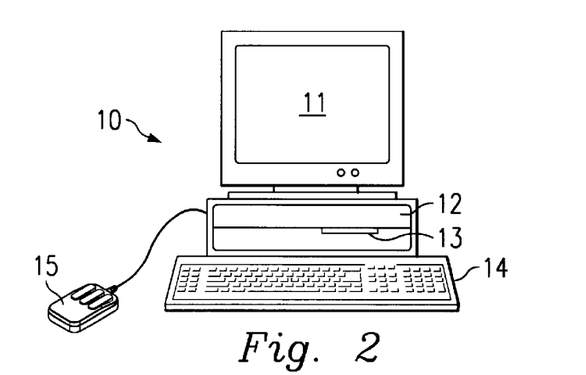
FIG. 2 illustrates a graphical display system in which the present invention may be practiced.

Referring to FIG. 2, the graphical display system 10 preferably includes a two-dimensional graphical display (also referred to as a "screen") 11, preferably a high-resolution color graphics display, and a central processing unit 12. The central processing unit contains a microprocessor (not shown) and random access memory (not shown) for storing programs therein for processing by the microprocessor. A disk drive 13 for loading programs may also be provided. A keyboard 14 having a plurality of keys thereon is connected to the central processing unit 12, and a pointing device such as a mouse 15 is also connected to the central processing unit 12. It will also be understood by those having skill in the art that one or more (including all) of the elements/steps of the present invention may be implemented using software executing on a general purpose graphical display system, using special purpose hardware-based graphical display systems, or using combinations of special purpose hardware and software.

As described above, known texture mapping systems and methods are generally not fast enough or are not accurate enough to use in interactive rendering. Interactive rendering generally requires texture mapping that is both as fast as linear approximation and as accurate as the exact calculation.

There are special cases where linear approximation is sufficiently accurate. For example, if an entire polygon is at the same depth, i.e. the viewing vector is parallel to a vector that is normal to the plane of the polygon, then linear approximation produces an exact perspective. Similarly, if the polygon varies only slightly in depth, the error caused by linear approximation may be so small as to be insignificant.

The premise of subdivision in texture mapping is that since each subpolygon varies little in depth, the subpolygons may be rendered with linear approximation and be visually acceptable. If distortion could be quantified, texture mapping could determine the error in the linear approximation and decide whether to subdivide based on that determination. The number of subdivisions would not need to be fixed beforehand, and subdivision could continue until the error is not only visually insignificant, but also below a given bound. Such texture mapping could be made as correct as is desired and, with only the extra overhead of error calculation and subdivision, it would be almost as fast as linear approximation.

To quantify error in linear approximation, there must be a definition for that error. Accordingly, a definition of error in texture mapping will now be derived.

Definition of Error in Texture Mapping

Since methods and systems to calculate correct texture mapping are known, they can provide a baseline for the definition of error. In other words, a polygon which is texture mapped with exact calculation has no error anywhere. Error can be defined as the difference between an incorrect mapping, e.g. with linear interpolation, and the correct mapping.

To simplify matters, consider the graphical display 11 to be a continuous domain rather than a discrete, pixilated domain. This means that all points on the display within the polygon have corresponding texture coordinates, not just the pixel centers. For a correct mapping, all these points are mapped to the correct texture coordinates, while an incorrect mapping maps some display points to incorrect texture coordinates.

The error at a point on the display will now be described. Consider a display point $(x_s, y_s)$ inside the polygon mapped to an incorrect texture coordinate $(u_{wrong}, v_{wrong})$. The correct texture coordinate that $(x_s, y_s)$ should be mapped to is $(u_{scorrect}, v_{scorrect})$. Assume that there is another point $(x_{s2}, y_{s2})$ on the display which is mapped to $(u_{scorrect}, v_{scorrect})$. The error in the mapping at point $(x_s, y_s)$ is the distance between $(x_{s2}, y_{s2})$ and $(x_s, y_s)$, that is, $\sqrt{(x_{s2}-x_s)^2+(y_{s2}-y_s)^2}$. A square root will be referred to herein as "sqrt".

The error is in units of distance, and on the display a typical unit of distance is the height or width of a pixel. An error of 2.3 pixels at a point $(x_s, y_s)$, for example, would indicate that a point 2.3 pixel-widths away from $(x_s, y_s)$ was mapped with the texture coordinate that should have been mapped to $(x_s, y_s)$. It will be understood that non-integer pixel values are used because a continuous screen space with a continuous mapping was assumed.

This definition of error allows a quantitative evaluation of the quality of an approximation. Significantly, as the error falls below 1 and approaches 0, the error is unobservable—the mapping is essentially perspective correct.

Linear approximation interpolates texture coordinates along polygon edges and across scanlines. Exact calculation also interpolates a division value and divides to find exact texture coordinates along polygon edges and across scanlines. Texture coordinates along a line in display space must generally be found during texture mapping. Accordingly, error along a line of linearly interpolated texture coordinates will now be derived. The ability to calculate error along a line of linear approximation provides the ability to calculate error for a whole polygon.

Figure 3:
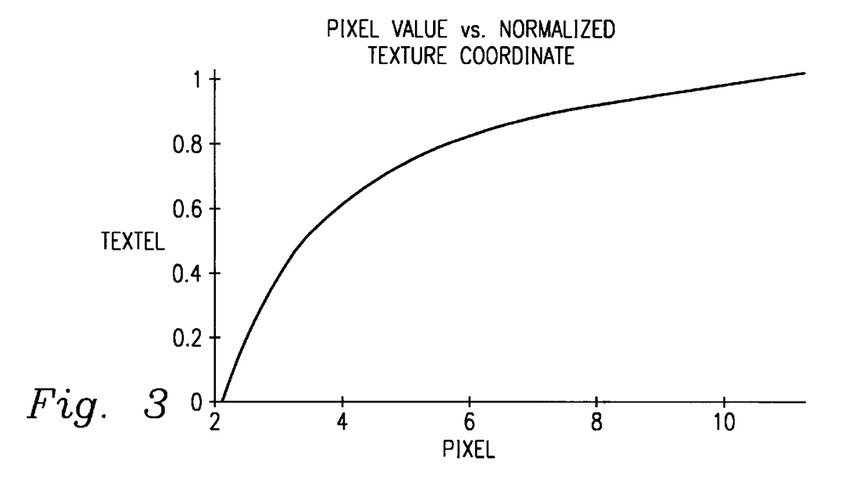
FIGS. 3–5 graphically illustrate texture mapping error.

A graphical representation for examining texture coordinate calculation along a line will now be derived. FIG. 3 graphically represents Equation (3). The pixel position lies along the x-axis. The normalized texture coordinate lies along the y-axis. In FIG. 3, the value goes from 1 to 6 as the $x_s$ value goes from 2 to 11. This is clearly a non-linear relationship.

Still referring to FIG. 3, the number of texels in the texture map is irrelevant, so that the texture coordinates are normalized. Unless there is only one texel, in which case there is really no texture map, rendering must be accurate to the same degree for any number of texels. The reason is that even if single texels occupy many pixels (say 1000 pixels), if the texture-mapping error is large (say 100 pixels), the edge between the texels is far from its proper position on the display. The irrelevance of the texture size is the reason that the definition of error in texture mapping is based on pixel measures rather than texel measures.

The number of pixels on the x-axis of the curve, however, is important. This number determines how "stretched out" the curve will be. Additionally, if there is only one pixel on the x-axis, the maximum possible error is zero pixels, since that one pixel is associated with all the texture coordinates.

Figure 4:
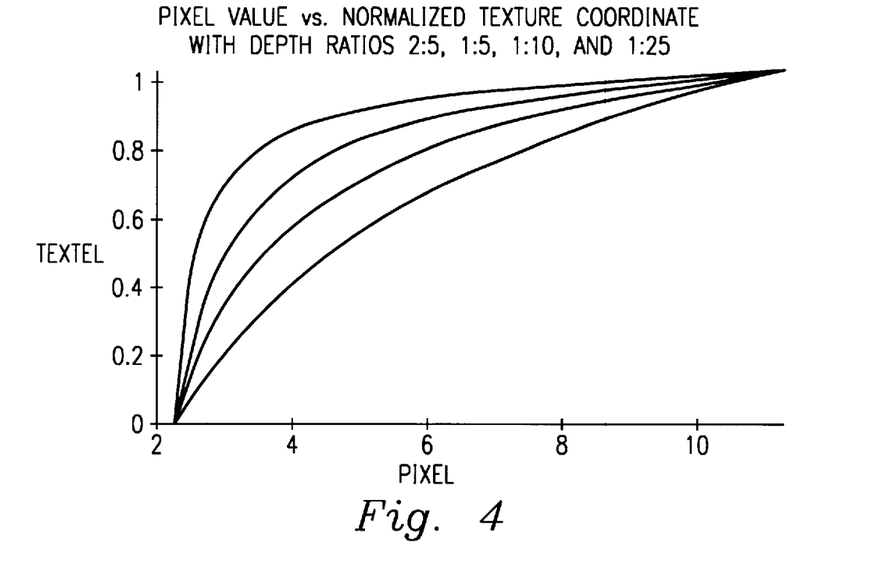

The last determinate of the shape of the pixel-texel curve of FIG. 3 is the perspective divide values $w_1$ and $w_2$, that is, the divide values at $x_{s1}$ and $x_{s2}$. The ratio $w_1:w_2$ determines the "sharpness" of the pixel-texel curve. The lower the ratio, the sharper the curve. FIG. 4 graphically illustrates the curve of FIG. 3 with various ratios. As shown, the ratio affects the shape of the curve, rather than the values of $w_1$ and $w_2$ or the distance traversed in w.

Maximum Error in Linear Approximation

With the above-described definition of error in texture mapping, the maximum error for any point in a texture mapped polygon in a linear approximation to perspective correct texture mapping may be determined. A subdivision algorithm may then quantitatively evaluate a stopping criterion based on the worst case error in a texture-mapped subpolygon.

Figure 5:
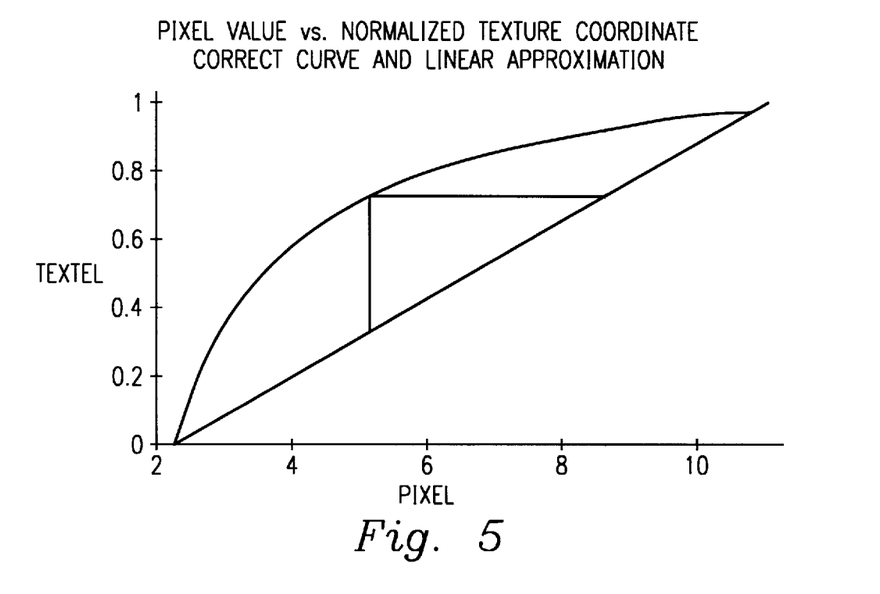

FIG. 5 graphically illustrates linear approximation on a pixel-texel curve along with the correct relationship. At point $x_s$, where $x_{s1} \leq x_s \leq x_{s2}$, a vertical line is shown. The intersection of this vertical line and the perspective correct curve is the correct texture coordinate for pixel coordinate $x_s$. A horizontal line is shown through this intersection. The intersection of the horizontal line and the linear approximation line is at the display point, $x_{scorrect}$ which actually has that texture coordinate. The horizontal distance $x_{scorrect} - x_s$ is the number of pixels from the point that has the correct texture coordinate to the point where that texture coordinate should reside. This is the definition of error described above, shown in graphical terms.

A mathematical description of the error will now be provided. This error is the x position of the correct texture coordinate minus the x position of where this coordinate should be:

$$\text{error} = x_{scorrect} - x_s$$

Since the approximation is linear and the u coordinate is normalized between 0 and 1, the x position of the correct texture coordinate is:

$$x_{scorrect} = x_{s1} + u_{correct}(x_{s2} - x_{s1})$$

so that $$\text{error} = x_{s1} + u_{correct}(x_{s2} - x_{s1}) - x_s.$$

Substituting for $u_{correct}$ from Equation (3):

$$\text{error} = x_{s1} + \frac{((x_s/w) - (x_{s1}/w_1))(xs_2 - x_{s1})}{((x_{s2}/w_2) - (x_{s1}/w_1))} \quad (4)$$

There are two variables, $x_s$ and w, in Equation (4), and one must be eliminated. It is more mathematically tractable to work in terms of w, and $x_s$ is linear with respect to w, so that $$x_s = x_{s1} + (x_{s2} - x_{s1})(w - w_1)/(w_2 - w_1).$$

Substituting $x_s$ above into Equation (4):

$$\text{error} = xs1 +$$

$$\frac{\frac{x_{s1} + (x_{s2} - x_{s1})(w - w_1)/(w_2 - w_1)}{w} - (x_{s1}/w_1)}{((x_{s2}/w_2) - (x_{s1}/w_1))}(x_{s2} - x_{s1}) -$$

$$(x1 + ((w - w_1)/(w_2 - w_1))(x_{s2} - x_{s1}))$$

Which simplifies to $$\text{error} = (x_{s2} - x_{s1})(w_1 - w)(w - w_2)/(w_2 w - w_1 w) \quad (5)$$

Taking the derivative with respect to w and simplifying:

$$d(\text{error})/dw = (x_{s2} - x_{s1})(w_1 w_2 - w^2)/(w^2(w_2 - w_1))$$

Setting the derivative to zero and solving for w:

$$(x_{s2} - x_{s1})(w_1 w_2 - w^2)/(w^2(w_2 - w_1)) = 0$$

$$w = \text{sqrt}(w_1 w_2) \text{ or } -\text{sqrt}(w_1 w_2)$$

This is the location of a local maximum for the error.

If the viewpoint is at z=0 and depth increases as z increases, the only reasonable root is sqrt($w_1 w_2$). This is a surprisingly simple result. The x position of the worst error is:

$$x_{worsterror} = x_1 + (x_2 - x_1)(\text{sqrt }(w_1 w_2) - w_1)/(w_2 - w_1)$$

This pixel position is at the "elbow" of the pixel vs. texel curve.

Substituting sqrt ($w_1 w_2$) into Equation (5):

$$\text{worst error} = \frac{(x_{s2} - x_{s1})(w_1 - \text{sqrt}(w_1 w_2))(\text{sqrt}(w_1 w_2) - w_2)}{(\text{sqrt}(w_1 w_2)(w_2 - w_1))} \quad (6a)$$

$$= \frac{(x_{s2} - x_{s1})\text{sqrt}(w_1 w_2)(\text{sqrt}(w_1) - \text{sqrt}(w_2))(\text{sqrt}(w_1) - \text{sqrt}(w_2))}{(\text{sqrt}(w_1 w_2)(\text{sqrt}(w_2) + \text{sqrt}(w_1))(\text{sqrt}(w_2) - \text{sqrt}(w_1)))}$$

$$= \frac{(x_{s2} - x_{s1})(\text{sqrt}(w_2) - \text{sqrt}(w_1))}{(\text{sqrt}(w_2) + \text{sqrt}(w_1))}$$

An identical analysis applies to the $y_s$ coordinate, so the maximum error in the $y_s$ direction is:

$$\frac{(y_{s2} - y_{s1})(\text{sqrt}(w_2) - \text{sqrt}(w_1))}{(\text{sqrt}(w_2) + \text{sqrt}(w_1))} \quad (6b)$$

The Longest Interpolation for a Predetermined Error

The above equations for the maximum error in a linear interpolation approximation are very useful for quantitatively determining if a polygon needs to be subdivided before rendering. Equations which show exactly where subdivisions must occur if texture mapping error is not to exceed a certain value, will now be derived.

Consider a segment in screen space from ($x_{s1}$, $y_{s1}$, $w_1$) to ($x_{s2}$, $y_{s2}$, $w_2$) with correct texture points ($u_1$, $v_1$) and ($u_2$, $v_2$). Assume $0 < w_1 < w_2$. If a correct texture coordinate (u, v) is found for a point ($x_s$, $y_s$) along the segment, what is the farthest ($x_s$, $y_s$, w) can be from ($x_{s1}$, $y_{s1}$) and still have linear interpolation from ($u_1$, $v_1$) to (u, v) nowhere exceed a given error of n pixels? Answering this question allows a texture mapping method and system to divide a line into pieces, each of which could be linearly interpolated with a maximum texture mapping error of n pixels.

The maximum error along the x axis, from Equation (6a) is $$\text{max error} = \frac{(x_s - x_{s1})(\text{sqrt}(w) - \text{sqrt}(w_1))}{(\text{sqrt}(w) + \text{sqrt}(w_1))} \quad (7)$$

The maximum error along the y axis is:

$$\text{max error} = \frac{(y_s - y_{s1})(\text{sqrt}(w) - \text{sqrt}(w_1))}{(\text{sqrt}(w) + \text{sqrt}(w_1))}$$

Assume ($x_s - x_{s1}$) > ($y_s - y_{s1}$). Assume only the worst case matters, because if there is a maximum of ½ pixel error, as long as the worst case x or y error is ½ pixel or less, the correct texture coordinate remains in the same pixel. Since w is linear with respect to x:

$$x_s = x_{s1} + (x_{s2} - x_{s1})(w - w_1)/(w_2 - w_1) \quad (8)$$

Substituting Equation (8) into Equation (7) and simplifying:

$$\text{max error} = (x_{s2} - x_{s1})(\text{sqrt}(w) - \text{sqrt}(w_1))^2/(w_2 - w_1)$$

If this error must be less than n pixels:

$$(x_{s2} - x_{s1})(\text{sqrt}(w) - \text{sqrt}(w_1))^2/(w_2 - w_1) < n$$

which implies that $$\text{sqrt}(w) < \text{sqrt}(w_1) + \text{sqrt}(n(w_2 - w_1)/(x_{s2} - x_{s1})) \quad (9)$$

Accordingly, the maximum texture mapping error is n pixels when interpolating along a segment ($x_{s1}$, $y_{s1}$, $w_1$) to ($x_s$, $y_s$, w) where w fulfills Equation (9).

If all points of a polygon are at the same depth, there is no perspective distortion. The distortion is caused by division, and if the division value is the same throughout the polygon, there is no nonlinearity.

Similarly, if all points along a segment inside a polygon are at the same depth, there is no distortion along that line. Such a line is referred to as a line of constant depth. Along lines of constant depth, then, linear interpolation of texture points is exactly correct. In the previous analysis, this corresponds to a case where $w_1=w_2$. Since polygons are planer in nature, parallel lines of constant depth can construct any polygon.

Intelligent Subdivision

Operations for performing texture mapping according to the present invention will now be described. It will be understood by those having skill in the art that these operations are typically performed by a stored program executing on central processing unit 12 and displayed on graphical display 11 of FIG. 1. However, it will be understood that special purpose hardware may also be used to perform some or all of these operations, either alone or in combination with a stored program.

Figure 6:
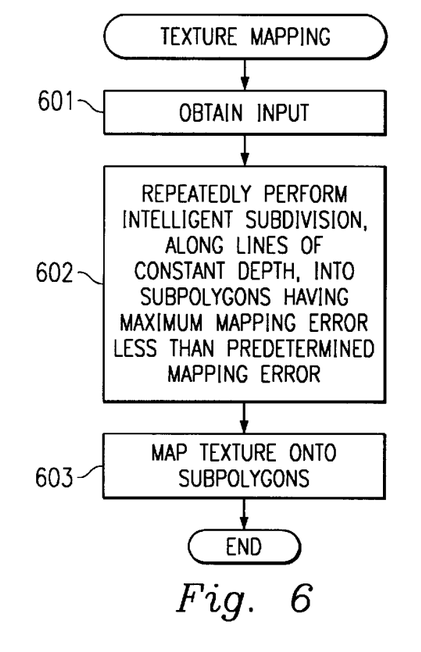
FIG. 6 is a flowchart illustrating overall operations for texture mapping according to the present invention.

Referring now to FIG. 6, texture mapping begins at Block 601 by obtaining input for texture mapping. In particular, arbitrary polygons are obtained with the correct texture coordinates at the vertices thereof, using well-known techniques. At Block 602, intelligent subdivision is repeatedly performed. In particular, intelligent subdivision is repeatedly performed to divide the polygon into subpolygons along lines of constant depth having an acceptable maximum mapping error. The polygon is thus divided into subpolygons having maximum mapping error less than a predetermined maximum mapping error, so that the subpolygons may be rendered with linear interpolation of texture coordinates, without exceeding a given error bound. The subdivision is performed along lines of constant depth. Moreover, the subdivision is performed at intelligent locations, rather than dividing the polygon in half, so that the number of subdivisions is reduced. At Block 603, the texture is mapped onto the subpolygons by rendering the subpolygons. The texture coordinates are linearly interpolated along polygon edges and across the scanlines which make up the subpolygons.

Accordingly, the present invention takes advantage of the "lines of constant depth" concept, and utilizes the above described new maximum error calculations to determine where to subdivide and when to stop subdividing.

Figure 10:
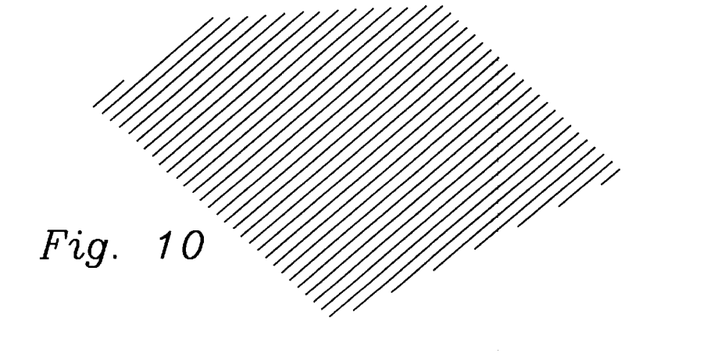
FIG. 10 illustrates a polygon which is filled with lines of constant depth.

Since there is no perspective distortion along lines of constant depth, and since lines of constant depth can construct any polygon, the polygon can be drawn along its lines of constant depth. The slope of the constant depth lines on the polygon is found. The point or side of the polygon with the greatest depth is found. The entire polygon is then drawn as a series of lines of constant depth. Each successive line should be one pixel right (or left, or above, or below) the previous line. See FIG. 10. For each line, the system must find where it intersects the polygon and what the correct texture coordinates are at these points. The texture coordinates are interpolated along the line and are only wrong insofar as the lines will not pass precisely though the center of each pixel.

A special case occurs when the polygon is aligned with one axis of the viewer's coordinate system. In this case, horizontal or vertical display lines are lines of constant depth. This allows for especially easy rendering. Several personal computer games have used this fact to advantage in texture mapping "walls" and "floors" in virtual environments.

Figure 11:
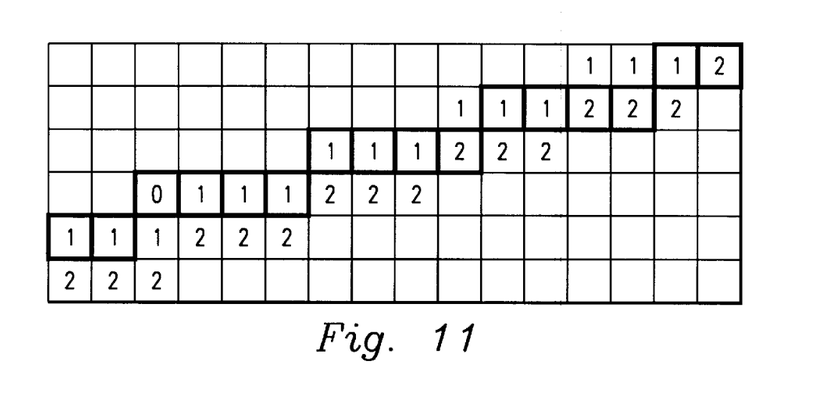
FIG. 11 graphically illustrates interaction between polygon edges and lines of constant depth.

It will be understood that the lines of constant depth may interact oddly with the polygon edges. Due to the finite resolution of the pixels, the intersections of the polygon edges and lines of constant depth may continue for several pixels and may skip pixels that would otherwise be on the line of constant depth. For example, see FIG. 11. In FIG. 11, squares represent pixels, bold squares represent the polygon edge, and numbered squares indicate different lines of constant depth. Polygon edges may therefore be difficult to draw, and it may be difficult to make abutting polygons look precisely correct. One solution to this problem is to redraw all the polygon edges after completing the texture map fill in the polygon interiors.

Check/Subdivide/Check

Figure 7:
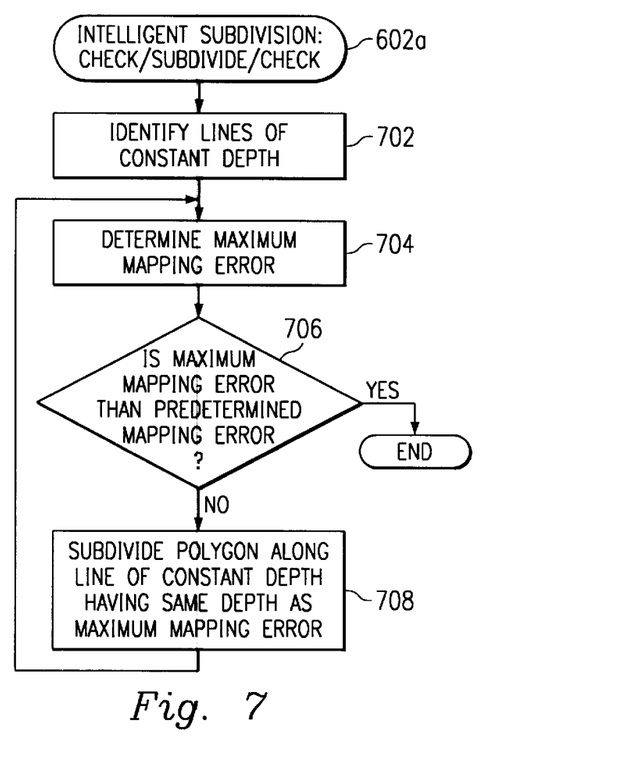
FIGS. 7–9 are flowcharts illustrating Check/Subdivide/Check texture mapping operations according to a first embodiment of the present invention.

Referring now to FIG. 7, a first embodiment 602a of intelligent subdivision (Block 602 of FIG. 6) will now be described. In this embodiment, a check of the subdivided polygon is performed to determine whether the subpolygons have a maximum error which is within acceptable bounds. If not, subdivision is performed again. Accordingly, this embodiment may be referred to as "Check/Subdivide/Check" embodiment.

Referring now to FIG. 7 at Block 702, lines of constant depth are identified in the polygon. At Block 704, the maximum mapping error, i.e., the worst case error for linearly interpolating texture coordinates along polygon edges and across scanlines, is determined. At Block 706, a check is made as to whether the maximum mapping error is within acceptable bounds, i.e. is less than the predetermined mapping error. If yes, operations end. If no, the polygon is subdivided along the line of constant depth having the same depth as the maximum mapping error at Block 708. Thus, the mapping error is evenly distributed among subdivided pieces.

Figure 8:
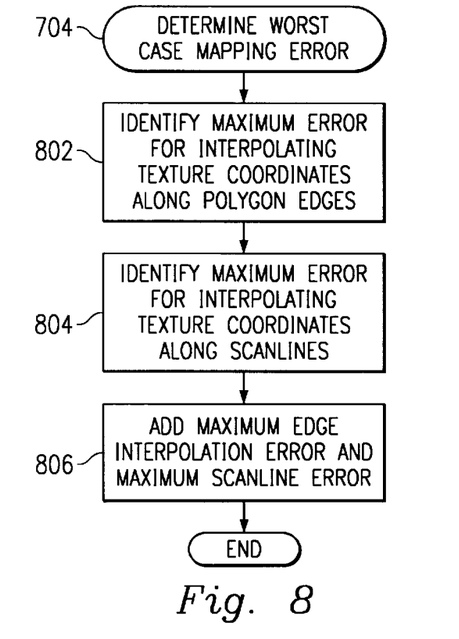

Referring now to FIG. 8, operations for determining worst case mapping error (Block 704 of FIG. 7) will now be described. As shown at Block 802, the maximum error for identifying texture coordinates along polygon edges is identified. For example, the maximum error for each polygon edge is determined and the maximum of these errors is identified. At Block 804, the maximum error for interpolating texture coordinates along scanlines is identified. For example, a bounding parallelogram operation described below may be used to find the worst case error for interpolating texture coordinates along scanlines. At Block 806, the maximum edge interpolation error is added to the maximum scanline error to obtain the line of constant depth having greatest mapping error.

Figure 9:
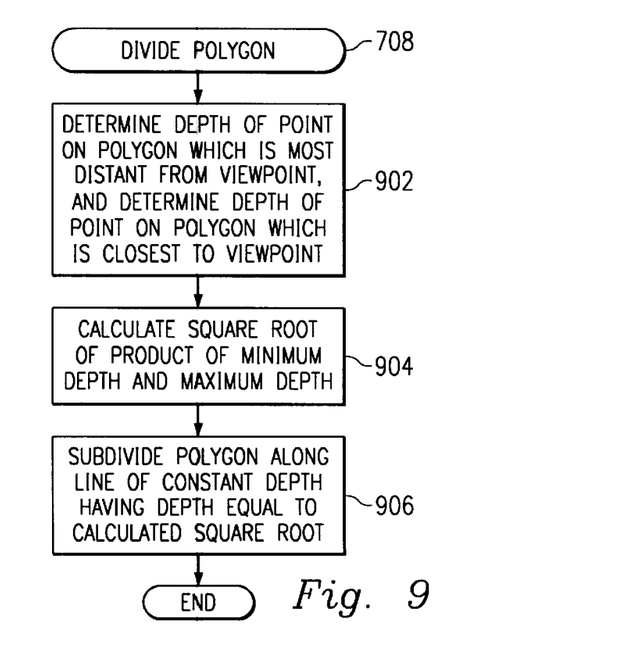

Referring now to FIG. 9, operations for subdividing a polygon along the line of constant depth having the same depth as the maximum mapping error (Block 708 of FIG. 7) will now be described. At Block 902, the depth of a first point on the polygon which is most distant (farthest) from the viewpoint and the depth of a second point on the polygon which is closest to the viewpoint are determined. The square root of the product of the first and second points are calculated at Block 904. Alternatively, a fast approximation method for a square root may be used to obtain a close but not absolutely correct value. At Block 906, the polygon is subdivided along the line of constant depth having depth equal to the calculated square root. Subdividing the polygon along this line will split the polygon approximately where interpolation is error is worst.

The above operations for performing the Check/Subdivide/Check embodiment will now be described in further detail. The above analysis has shown that the worst error along a line of linear interpolation between two display points $(x_{s1}, y_{s2}, w_1)$ and $(x_{s2}, y_{s2}, w_2)$ occurs where $w=\text{sqrt}(w_1 w_2)$. A preferred line to divide is the line of constant depth where the depth is equal to $\text{sqrt}(1/(z_{min}z_{max}))$ where $z_{min}$ and $z_{max}$ are the minimum and maximum depth values on the polygon. Dividing along this line produces better results than dividing the polygon in half in either display or pre-projection space.

Moreover, using the definition of error in texture mapping, and the equations to calculate the maximum error for linear interpolation along a line, a quantitative determination can be made whether a given polygon should be subdivided.

Assume a polygon is drawn by linearly interpolating texture coordinates between vertices and also across scanlines. Using Equations (6a) and (6b), the worst case error along polygon edges is calculated (Block 802). The worst case error along the worst case scanline in the polygon is also calculated (Block 804). If the worst possible sum of edge-interpolation error and scan-line error (Block 806) do not exceed the maximum allowable error (Block 706), subdivision ceases.

Subdivision also preferably ceases if the polygons shrink sufficiently, for example when the polygon is completely filled by two parallel lines of constant depth. Thus, subdivision preferably is performed only if the subpolygon is greater than a predetermined size. Note that new edges introduced by subdividing along lines of constant depth have no interpolation error.

While the equations for finding worst-case error involve square roots, the square root calculation may be performed efficiently. A table accurate to only a few bits (e.g. 8), or a square root approximation should provide sufficient accuracy, especially if the Check/Subdivide/Check determination errs on the "too correct" side.

There are also other conservative options for the worst-case scanline problem. One worst case calculation comes from a "bounding parallelogram" technique. In particular, the polygon is bound by a parallelogram with two sides along lines of constant depth and with the other two sides scanline-aligned. The worst possible scanline is across the scanline width of the parallelogram. The depth values of this worst-case scanline are the maximum and minimum depths of the polygon. Equations (6) can be used to calculate the worst possible scanline error.

Cases where lines of constant depth are close to parallel with scanlines may cause subdivide/check/subdivide determination to excessively subdivide polygons. Excessive subdivision may be avoided by drawing along vertical scanlines when the slope of lines of constant depth is shallow, or drawing along vertical scanlines when the slope is less than 45°.

Pseudocode for Check/Subdivide/Check

Although not required to enable those skilled in the art to practice Check/Subdivide/Check according to the invention, pseudocode for Check/Subdivide/Check will now be provided.
Subdivision at the worst point

Figure 19A:
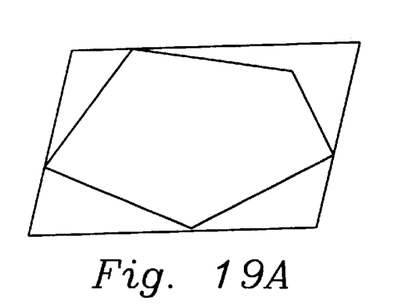
FIGS. 19A and 19B illustrate two examples of bounding parallelograms.
Figure 19B:
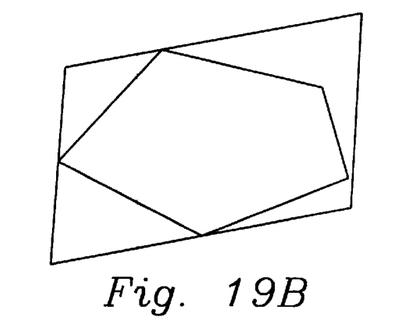

```
DrawPolygon (P)
{
    if(P is too small for subdivision)
    {
        DrawPolygonWithLinearInterpolation (P)
    }
    mindepth = FindMinimumDepthInPolygon (P);
    maxdepth = FindMaximumDepthInPolygon (P);
    maxerror =
 MaxErrorInLinearInterpolation (P,mindepth,maxdepth)
    if (MaximumAcceptableError < maxerror}
    {
        divisiondepth = sqrt (maxdepth*mindepth);
        SubdividePolyAlongConstantDepthLine
 (P,divisiondepth,SubP1,SubP2)
            DrawPolygon (SubP1);
            DrawPolygon (SubP2);
    }
    else
    {
        DrawPolygonWithLinearInterpolation (P)
    }
}
DrawPolygonWithLinearInterpolation (P)
{
    renders textured polygon P by linearly
 interpolating texture coordinates along polygon edges
 and along scanlines. If the slope of the lines of
 constant depth is 45 degrees or more, the scanlines are
 horizontal, otherwise the scanlines are vertical.
}
MaxErrorInLinearInterpolation (P,mindepth,maxdepth)
{
    maxEdgeError =
        WorstErrorFromPolygonEdges (P);
    maxScanlineError =
 WorstErrorFromScanlines (P,mindepth,maxdepth);
    worstCaseError = maxEdgeError +
 maxScanlineError;
    return (worstCaseError);
}
WorstErrorFromPolygonEdges (P)
{
    WorstErrorSoFar = 0
    For Each Polygon Edge Do
    {
        thisEdgeMaxError =
 MaxErrorForSegmentInterpolation (edge i)
            if (thisEdgeMaxError > WorstErrorSoFar)
            {WorstErrorSoFar = thisEdgeMaxError}
    }
    return(WorstErrorSoFar);
}
MaxErrorForSegmentInterpolation (edge)
{
    edge is (x1,y1,z1), (x2,y2,z2) with z1 and z2
 depth values.
    (we assume z1 > 0 and z2 > 0)
    distance = max(abs(x2-x1), abs(y2-y1))
    w1 = 1/z1;
    w2 = 1/z2;
    maxerror = distance * (sqrt(w2) -
        sqrt (w1))/(sqrt (w2)+sqrt (w1))
    maxerror = abs (maxerror);
    return (maxerror);
}
WorstErrorFromScanlines (P,mindepth,maxdepth)
{
    BP =
 FindBoundingParallelogram (P,mindepth,maxdepth)
    maxerror =
 MaxErrorForParallelogramScanlineInterpolation (BP)
    return (maxerror)
}
FindBoundingParallelogram (P,mindepth,maxdepth)
{
    If slope of constant depth lines is greater
 than 45 degrees then "scanlines" are horizontal and
 bounding parallelogram appears as shown in FIG. 19A.
    If slope of constant depth lines is less than 45
 degrees then "scanlines" are vertical and bounding
 parallelogram appear as shown in FIG. 19B.
}
```

-continued

```
MaxErrorForParallelogramScanlineInterpolation
(BP,mindepth,maxdepth)
{
    distance = height or width of BP (the
bounding parallelogram)
    w1 = 1/mindepth;
    w2 = 1/maxdepth;
    maxerror = distance * (sqrt(w2) -
      sqrt (w1))/(sqrt (w2)+sqrt (w1))
    maxerror = abs(maxerror);
    return (maxerror);
}
```

Predictive Subdivision

According to a second embodiment of the present invention, rather than subdividing and checking for sufficiently small error, it is possible to draw a texture mapped polygon one subpolygon at a time, knowing in advance that the subpolygon has sufficiently small error. This embodiment will be referred to as "Predictive Subdivision".

In Predictive Subdivision, the polygon is divided into subpolygons which may be rendered with linear interpolation of texture coordinates and have an error within a given error bound. Subdivision is performed on lines of constant depth and at intelligent locations so that the number of subdivisions is minimized. The polygon is divided so that there is no need to check after each subdivision. Rather, each subpolygon is rendered without the error exceeding a given bound.

Figure 12:
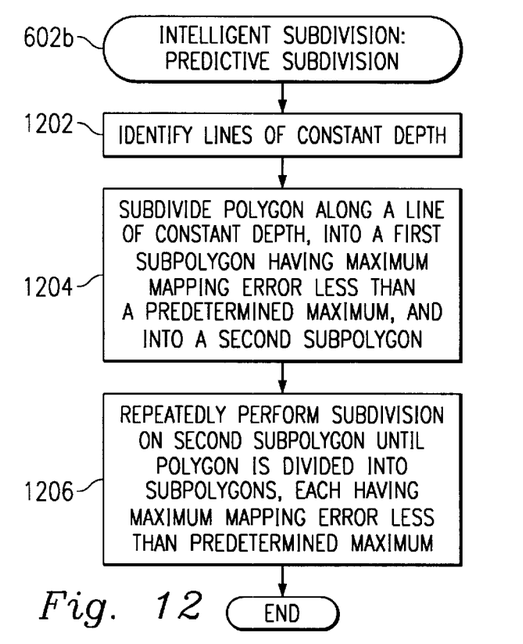
FIGS. 12–15 are flowcharts illustrating Predictive Subdivision operations according to a second embodiment of the present invention.

In particular, referring to FIG. 12, in the Predictive Subdivision embodiment 602b, lines of constant depth are identified at Block 1202. At Block 1204, the polygon is divided along a line of constant depth into a first subpolygon which has a maximum mapping error which is less than a predetermined maximum, and into a second polygon, at Block 1204. At Block 1206, the subdivision of Block 1204 is repeatedly performed on the second polygon, until the entire polygon is divided into subpolygons, each having maximum mapping error less than the predetermined maximum. Accordingly, Blocks 1202 and 1204 operate to cross the polygon while subdividing the polygon along lines of constant depth, into subpolygons having a maximum mapping error which is less than a predetermined maximum mapping error.

Figure 13:
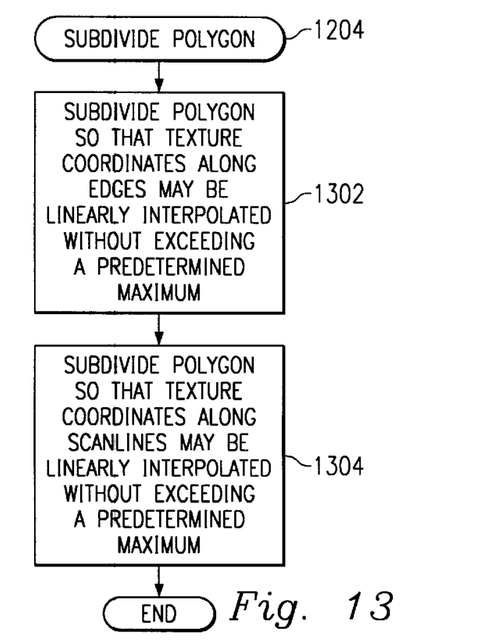

Referring now to FIG. 13, a two pass approach is preferably used for subdividing the polygon (Block 1204 of FIG. 12). The two pass approach ensures that all of the subpolygons will have a maximum mapping error which is less than a predetermined maximum. In particular, referring to FIG. 13, the first pass is performed at Block 1302, and the second pass is performed at Block 1304. At Block 1302, the polygon is subdivided to identify a tentative first subpolygon having texture coordinates along the edges which may be interpolated without exceeding a given error bound. However, this may result in the subpolygon having an unacceptable interpolation error across the scanlines. In the second pass at Block 1304, the tentative first subpolygon is further subdivided if necessary, so that texture coordinates along scanlines can be linearly interpolated without exceeding a given error bound, to thereby identify the first polygon.

Figure 14:
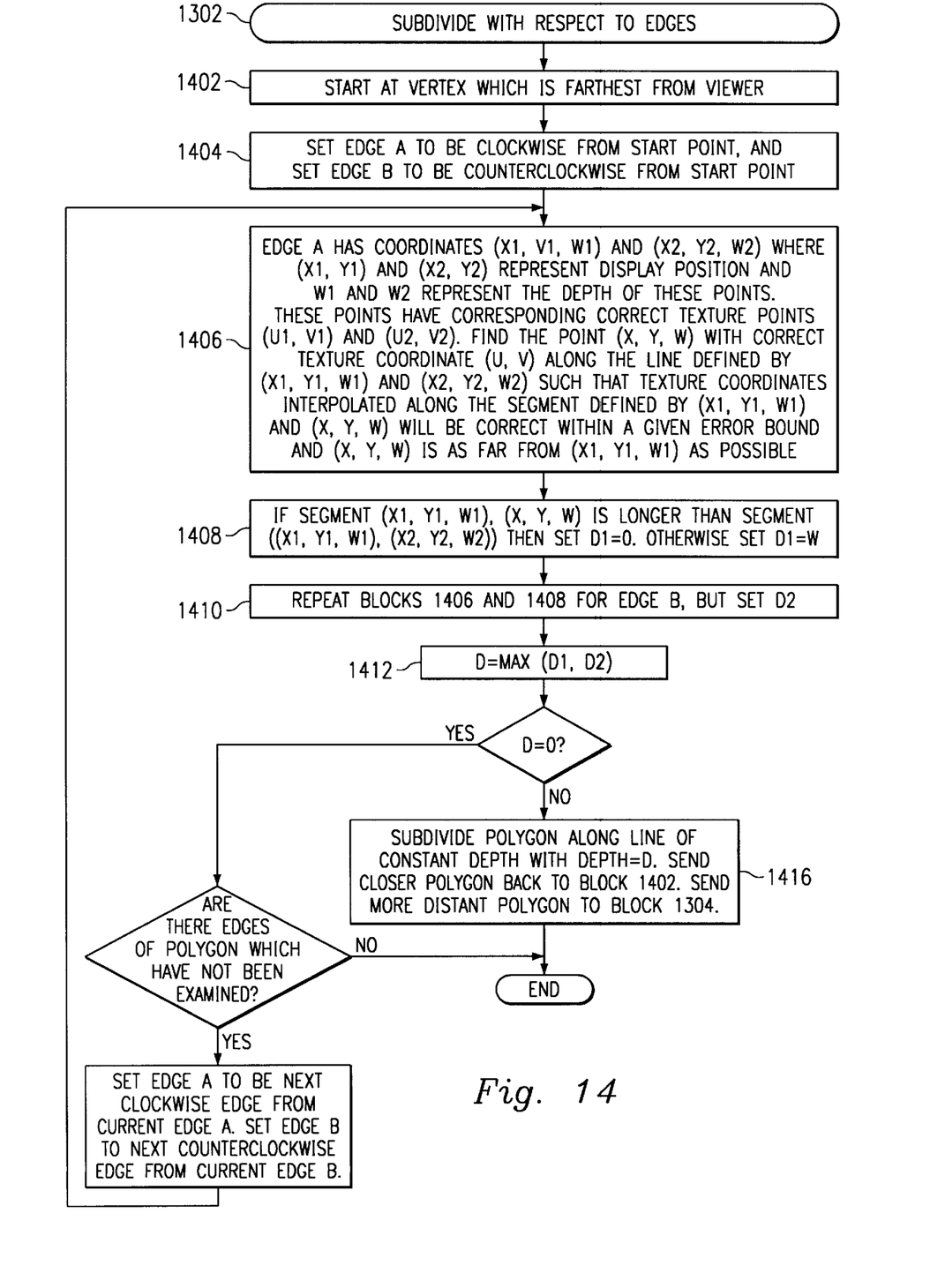

FIG. 14 illustrates operational details for the first pass (Block 1302 of FIG. 13). At Block 1402, the vertex of the polygon with the greatest depth is found. The edges leading clockwise and counterclockwise from this vertex are examined at Block 1404. If linearly interpolating along either edge exceeds the allowable error of Equations (6a) and (6b) at Blocks 1406, 1408, 1410, 1412, and 1414, the entire polygon is divided along a line of constant depth with the depth determined by Equation (9), at Block 1416. Alternatively, operations can start by assuming subdivision must occur along an edge and calculating the dividing depth value using Equation (9). If this depth is less than least depth along the edge, then there is no need to subdivide that segment. This alternative may obviate the calculation of both Equations (6a) and (6b).

Still referring to FIG. 14, if both edges exceed the allowable error, the worst case (i.e. the greatest depth) is used. If neither edge exceeds the allowable error, proceed to the next pair of edges at Blocks 1418 and 1420. Whenever a subdivision occurs at Block 1416, the subpolygon with greater maximum depth proceeds to the second pass, and the other subpolygon recursively enters the first pass. Recursion stops when no edges exceed the allowable error.

Figure 15:
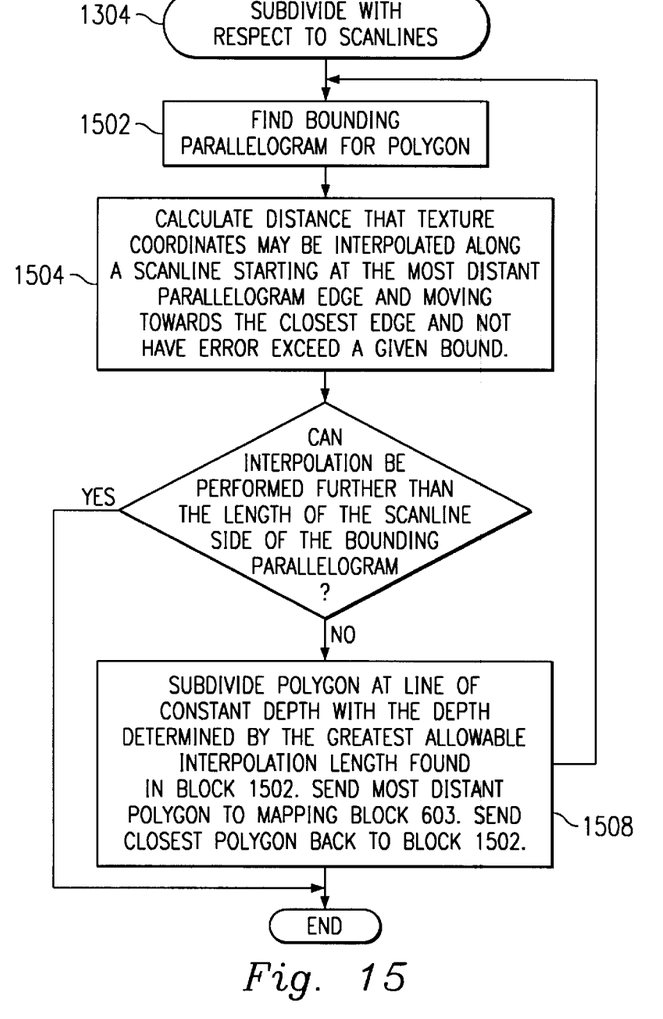

Referring now to FIG. 15, the second pass (Block 1304 of FIG. 13) deals with scanlines. If the lines of constant depth are more vertical than horizontal, the operations may use normal horizontal scanlines. Otherwise the operations draw along vertical lines.

In the second pass of FIG. 15, the operations of Block 1502 find a bounding parallelogram for the subpolygon which has two sides that are lines of constant depth and two sides which are parallel to the lines of drawing (vertical or horizontal). If a line of drawing which would cross the entire bounding parallelogram would not exceed the allowable error (Block 1504), no further subdivision is necessary (Block 1506). Otherwise, the polygon is subdivided along a line of constant depth with the depth again determined by Equation (9), at Block 1508.

Figure 16:
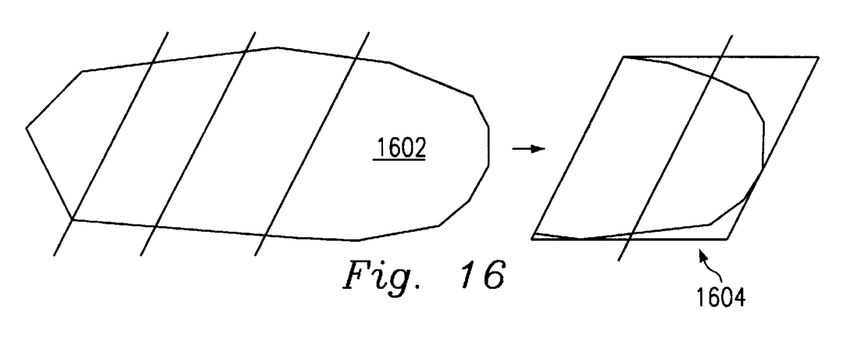
FIG. 16 illustrates an example of two-pass Predictive Subdivision according to the present invention.

FIG. 16 schematically illustrates the two pass approach of FIGS. 14 and 15. As shown at the left side of FIG. 16, under the first pass, the rightmost subpolygon 1602 is not further subdivided because each side is so short that linear interpolation results in little error. However, as shown on the right side of FIG. 16, the second pass divides this subpolygon because interpolation across the scanline would result in excessive error. The bounding parallelogram is shown at 1604.

In extreme cases, the above described operations may call for polygons to be subdivided into sub-pixel size pieces. As in the previous subdivision operations, sufficiently small subpolygons (e.g. those that can be filled by two parallel lines of constant depth) should not be subdivided.

Figure 1:
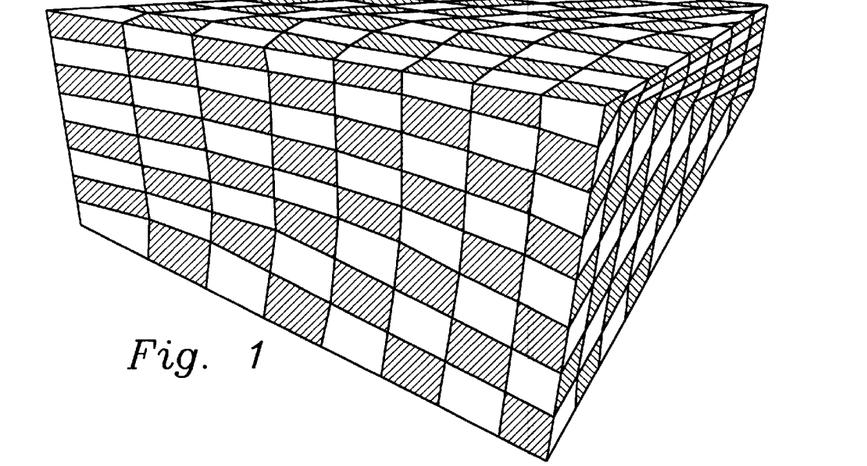
FIG. 1 illustrates a texture mapped cube using linear approximation.
Figure 17:
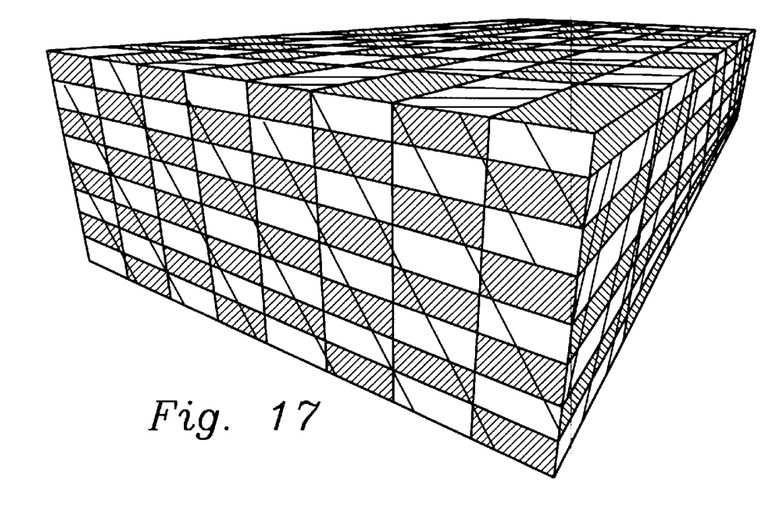
FIG. 17 illustrates the texture mapped cube of FIG. 1 which is rendered using the Predictive Subdivision embodiment of FIGS. 12–15.

In FIG. 17, the same checkerboard cube shown in FIG. 1 is rendered using the two-pass predictive subdivision algorithm. The subpolygons are outlined to show the placement of subdivision lines.

Pseudocode for Predictive Subdivision

Although not required to enable those skilled in the art to practice Predictive Subdivision according to the present invention, pseudocode for Predictive Subdivision will now be provided.

```
DrawPolygonPass1 (P)
{
    point1a = point2a =
FindPointWithGreatestDepth (P)
    point1b = FindNextClockwisePoint (P,point1a)
    point2b =
```

```
FindNextCounterClockwisePoint (P,point2a)
    //this loop continues until all edges in
polygon have gone
    //through loop
    NumberOfEdgesInPolygon =
FindNumofEdgesInPoly (P)
    NumberOfEdgesTested = 0
    while(NumberOfEdgesTested <
NumberOfEdgesInPolygon)
    {
        point1b =
FindNextClockwisePoint (P,point1a)
        point2b =
FindNextCounterClockwisePoint (P,point2a)
        divideDepth1 =
FindDivisionDepthAlongSegment (point1a,point1b)
        divideDepth2 =
FindDivisionDepthAlongSegment (point2a,point2b)
        if ((divideDepth1 < (depth at point1b))
or
        (divideDepth2 < (depth at point2b)))
        {
            divideDepth = max(divideDepth1,
divideDepth2)
            If(subdividing aiong this depth
line does not result in too small subpolygon)
            {
SubdividePolyAlongConstantDepthLine
(P,divisiondepth,SubP1,SubP2)
                DrawPolygonPass2 (SubP1)
                DrawPolygonPass1 (SubP2)
                return
            }
            Else
            {
SubdivideSmallestUsefulPieceOfPoly
(P,divisiondepth,SubP1,SubP2)
DrawPolygonWithLinearInterpolation (SubP1)
                DrawPolygonPass1 (SubP2)
                return
            }
        }
        point1a = point1b
        point2a = point2b
        NumberOfEdgesTested += 2
    }
    DrawPolygonPass2 (P)
}
DrawPolygonPass2 (P)
{
    BP =
FindBoundingParallelogram (P,mindepth,maxdepth)
    divisionDepth =
FindDivisionDepthForParallelogram (BP)
    if(divisionDepth <
minimumDepthInParallelogram (BP))
    {
        DrawPolygonWithLinearInterpolation (P)
    }
    else
    {
        If(subdividing along this depth line
does not result in too small subpolygon)
        {
            SubdividePolyAlongConstantDepthLine
(P,divisionDepth,SubP1,SubP2)
DrawPolygonWithLinearInterpolation (SubP1)
            DrawPolygonPass2(SubP2)
        }
        Else
        {
            SubdivideSmallestUsefulPieceOfPoly
(P,divisiondepth,SubP1,SubP2)
DrawPolygonWithLinearInterpolation (SubP1)
            DrawPolygonPass2 (SubP2)
            return
        }
    }
}
DrawPolygonWithLinearInterpolation (P)
{
    renders textured polygon P by linearly
interpolating texture coordinates along polygon edges
and along scanlines. If the slope of the lines of
constant depth is 45° or more, the scanlines are
horizontal, otherwise the scanlines are vertical.
}
FindDivisionDepthAlongsegment (point1,point2)
{
    (point1, point2) is (x1,y1,z1), (x2,y2,z2)
    With z1 and z2 depth values. (assume z1 > 0 and z2 > 0
    and z2 < z1)
        distance = max(abs(x2-x1),abs(y2-y1))
        w1 = 1/z1;
        w2 = 1/z2;
        sqrtdivdepth = sqrt(w1) +
            sqrt (N*(w2-w1)/distance)
        where N = MaxAcceptableError
        divisionDepth = sqrtdivdepth * sqrtdivdepth
        return (divisionDepth)
}
FindBoundingParallelogram (P,mindepth,maxdepth)
FindDivisionDepthForParallelogram (BP)
{
    distance = scanline width of BP (scanlines
can be vertical or horizontal)
        w1 = 1/(maximum depth in BP)
        w2 = 1/(minimum depth in BP)
        sqrtdivdepth = sqrt(w1) +
            sqrt (N*(w2-w1)/distance)
        where N = MaxAcceptableError
        divisionDepth = sqrtdivdepth * sqrtdivdepth
        return (divisionDepth)
}
```

Other Variations

Rendering preferably should interpolate correct texture coordinates both along polygon edges and across scanlines. However, scanlines require the most processing since they make up the bulk of the polygon fill (interior). As a result, a texture mapping can employ exact calculation as described above to obtain correct texture coordinates along polygon edges while sacrificing little speed.

If edge texture coordinates are calculated in this manner, only error due to linear interpolation along scanlines need be accommodated. Predictive Subdivision may only require the second pass, which handles error along scanlines. Check/Subdivide/Check may only need to check the worst case scanline. A third alternative considers each scanline separately, using Equations (6a), (6b), and/or (9) to determine if and where it should subdivide that particular scanline.

Instead of exactly calculating texture coordinates along polygon edges, the techniques described above can be used to linearly interpolate them. This technique would be similar to Predictive Subdivision, but the first pass would add new vertices along edges which have too much error, rather than subdividing the whole polygon. The new vertices would not change the shape of the polygon, but merely provide extra points with correct texture coordinates so that interpolation error remains within a given bound.

Rendering may be restricted to horizontal scanlines only, for example when a renderer uses hardware which can interpolate along normal horizontal scanlines but not "vertical" scanlines. Such a renderer may still use the present invention with minor modifications.

In particular, if lines of constant depth are almost parallel to scanlines, linear interpolation can proceed a long distance without much error, since the near-parallelism indicates that the depth ratio of opposite ends of the scanline will be slight. However, if the scanlines within the polygon are sufficiently long, the maximum linear interpolation error can become large. Again, since the lines of constant depth are almost parallel to scanlines, slicing a polygon along a line of constant depth will only slice through a few scanlines, leaving the remainder unaffected by the subdivision.

Figure 18:
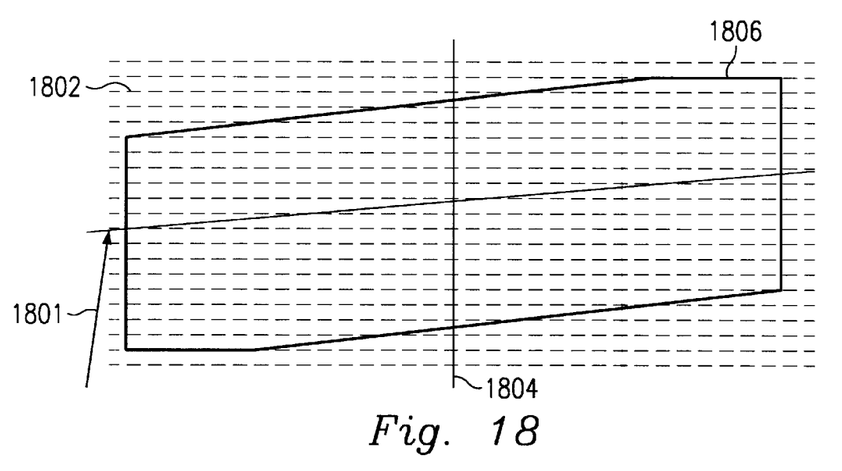
FIG. 18 illustrates an example of lines of constant depth which are almost parallel to scanlines.

An example is illustrated in FIG. 18. Line of constant depth 1801, almost parallel to scanlines 1802, only cuts a few scanlines 1802. Thus, subdividing only along lines of constant depth will generally result in far too many subdivisions. Excess subdivision may be reduced by slicing along some vertical lines, for example line 1804, which cuts most scanlines in polygon 1806 in half.

A special case also occurs in rendering textures when a texture-mapped polygon is aligned with one of the axes of the viewer's coordinate system. In this case, the lines of constant depth are vertical or horizontal screen lines. If a polygon is completely upright with respect to the viewer, the lines of constant depth are perfectly vertical. If a polygon lies completely flat with respect to the viewer, the lines of constant depth are perfectly horizontal.

This special case occurs quite frequently. Polygons which are completely upright often correspond to walls in an indoor environment, and polygons which are completely flat correspond to floors. Rendering which specifically addresses these cases is well-suited to rendering scenes where the viewer is likely to be upright in a setting with many vertical walls, visible flat floors, and polygons parallel to wall and floor planes (such as stairs and paintings).

Since the scanlines of these polygons are vertical or horizontal, rendering may linearly interpolate texture coordinates along vertical or horizontal scanlines, and the coordinates are guaranteed to be correct as long as the endpoint texture coordinates are correct. This fact may simplify the subdivision described above. For example, two-pass subdivision may become a one-pass subdivision.

An additional simplification may also be applied to wall-type polygons. As long as the texture is applied to the walls without any rotation, each successive vertical scanline is constant in one texture coordinate. In other words, each successive vertical scanline will have texture coordinate endpoints of $(u_1, v)$ and $(u_2, v)$ for some $u_1$, $u_2$, and v. Rendering need only interpolate one texture coordinate while the other remains constant, thus halving the number of required operations.

There is a similar constant texture coordinate case for floor-type polygons, but it only occurs when a viewpoint happens to be perpendicular to one texture coordinate axis and parallel to the other. While this is the usual case for wall-type polygons, it is uncommon for polygons parallel to the plane of the floor.

In conclusion, the present invention uses linear approximation but allows for correct texture mapping, at least to sub-pixel accuracy. Rather than requiring two divides or a divide and two multiplies per pixel, calculations can be incrementally additive except possibly for finding correct texture points at the ends of constant depth lines or polygon subdivisions. This produces significant savings in processing time while still yielding visually correct results.

Floating point hardware support is becoming more readily available, which allows floating point multiplies and divides to be as fast or faster than floating point adds. However, integer adds still tend to be faster than any floating point operation, and integer division is many times slower than integer adds. With sufficient bits per integer, the present invention allows texture mapping to take advantage of what is still the fastest mathematical operation on most computers.

Moreover, assuming all operations are equally fast, linear approximation is still faster than exact calculation because it requires fewer operations. Linear approximation does not require the interpolation of the divide value, which immediately reduces the number of calculations. Furthermore, in linear approximation, the texture coordinates come directly from the interpolation. In exact calculation, a divide must be performed after interpolation—additional operations, even if they are as fast as an add.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A method of mapping texture onto a polygon which is displayed on a graphical display, comprising the steps of:

identifying lines of constant depth in said polygon, the lines being either predominantly horizontal or predominantly vertical;

subdividing said polygon along one of the identified lines of constant depth, into a first subpolygon such that texture coordinates interpolated onto said first polygon have a maximum mapping error which is less than a predetermined maximum mapping error, and into a second subpolygon;

repeatedly performing said subdividing step on said second subpolygon to thereby subdivide said polygon into a plurality of subpolygons, such that texture coordinates interpolated onto each subpolygon of said plurality of subpolygons have an individual maximum mapping error which is less than said predetermined maximum mapping error, said subpolygons having corresponding individual maximum mapping errors for texture coordinates interpolated onto the subpolygon; and mapping texture onto said plurality of subpolygons along lines of drawing, the lines of drawing being vertical only if the predominance of the identified lines of constant deaph is horizontal.

2. A method according to claim 1 wherein said subdividing step comprises the steps of:

subdividing said polygon to identify a candidate first subpolygon such that texture coordinates interpolated onto said candidate first subpolygon have a maximum edge mapping error which is less than said predetermined maximum mapping error; and further subdividing said candidate first subpolygon to identify said first subpolygon such that texture coordinates interpolated onto said first subpolygon have a maximum scanline mapping error which is less than said predetermined maximum mapping error.

3. A method according to claim 1 wherein said subdividing step comprises the step of subdividing said polygon along a selected line of constant depth having a depth of the same magnitude as said predetermined mapping error.

4. A method according to claim 1 wherein said mapping step comprises the step of linearly interpolating texture onto the subpolygons.

5. A method according to claim 4 wherein said mapping step comprises the steps of:

linearly interpolating texture onto interiors of the subpolygons; and exactly mapping texture onto edges of the subpolygons.

6. A method according to claim 1 wherein said graphical display includes a plurality of pixels, and wherein said predetermined maximum mapping error is less than one pixel in size.

* * * * *